United States Patent [19]
Kleyman

[11] Patent Number: 5,741,088
[45] Date of Patent: Apr. 21, 1998

[54] APPARATUS FOR UNDERGROUND EXCAVATION

[75] Inventor: Gennady Kleyman, Brooklyn, N.Y.

[73] Assignee: Environment 2000, Inc., Parsippany, N.J.

[21] Appl. No.: 702,834

[22] Filed: Aug. 23, 1996

[51] Int. Cl.$^6$ ........................ F16L 1/00
[52] U.S. Cl. .............. 405/181; 405/154; 405/174; 405/178
[58] Field of Search .................. 405/174–183, 405/154

[56] References Cited

U.S. PATENT DOCUMENTS

| | | | |
|---|---|---|---|
| 2,052,372 | 8/1936 | Van Voorhis et al. | 405/154 |
| 2,386,615 | 10/1945 | Knapp | 405/181 X |
| 2,414,994 | 1/1947 | Wright | 405/181 X |
| 2,528,231 | 10/1950 | Knapp | 405/179 X |
| 2,731,738 | 1/1956 | Kossa | 405/154 X |
| 3,323,313 | 6/1967 | Owens . | |
| 3,546,890 | 12/1970 | Ede | 405/177 X |
| 4,179,227 | 12/1979 | Child, Jr. et al. . | |
| 4,285,613 | 8/1981 | Takagishi et al. . | |
| 4,626,134 | 12/1986 | Coumont . | |
| 4,655,639 | 4/1987 | Reece | 405/174 X |
| 4,685,831 | 8/1987 | Mahoney . | |
| 4,904,116 | 2/1990 | Hesse | 405/174 X |
| 5,190,409 | 3/1993 | Hall | 405/174 X |
| 5,464,308 | 11/1995 | Missout . | |

*Primary Examiner*—Dennis L. Taylor
*Attorney, Agent, or Firm*—Klauber & Jackson

[57] ABSTRACT

An excavation apparatus comprising: a wedge member for driving through the ground and for slidingly contacting and lifting an overburden located beneath the surface of the ground substantially toward the surface of the ground; a driving attachment member for driving the wedge member below and substantially parallel to the surface of the ground; and a lateral support member attached to the wedge member for guiding the overburden across the wedge member. The apparatus may remove an existing utility line, install a new utility line, apply bedding material beneath a new utility line, or form a trench.

42 Claims, 8 Drawing Sheets

APPARATUS FOR UNDERGROUND EXCAVATION

FIELD OF THE INVENTION

The present invention relates generally to an apparatus and process for manipulating one or more utility lines below the surface of the ground and pertains, more specifically, to a wedge apparatus which is driven below the surface of the ground in order to remove, install, or simultaneously remove and install an underground utility line.

BACKGROUND OF THE INVENTION

Current procedures for removing and installing pipelines and other utility lines are labor intensive, time-consuming, dangerous, and costly.

Removal of the pipeline or utility line usually requires first excavating a trench with a backhoe or similar powered equipment, exposing the pipe or utility line, sending workers into the trench to clear away the line and to assist the backhoe operator in establishing one or more pick points, attaching a cable to the pick points, and hauling a line out of the trench.

Installation of a pipeline or other utility line requires first excavating a trench to some distance below the proposed bottom of the pipe through the use of a backhoe, sheeting and reinforcing the side walls of the trench to prevent collapse, placing bedding material by the bucketload to the trench, sending workers into the trench to spread the bedding material evenly and to assist the backhoe operator in aligning the new line in the trench, and placing the line into the trench by backhoe using a cable-type holding system. Sections of the pipeline or utility line are typically joined together either by pushing one line into another by backhoe, or by sending workers into the trench to weld mechanical joints onto adjacent lines. After one or two lines are laid and connected, the section of line is pressure tested, and backfill is placed over the section. The backfill is then compacted on top of the installed line.

As an alternative to the above procedure for removal and/or installation, the industry is turning to "trenchless" installation. Such "trenchless" methods typically consist of slipping a new pipe into an old pipe, or "bursting" an old pipe in place and inserting a new pipe into the void space. Such practices are limited, for example, in their ability to deal with the removal or installation of ductile iron and/or steel utility lines. Therefore, the industry has a long-felt need for a simple but cost-effective means for replacing and installing pipelines or utility lines in a trenchless manner.

SUMMARY OF THE INVENTION

The present invention provides an excavation apparatus for insertion below an overburden located beneath the surface of the ground which is capable of being driven through the ground from the surface. The excavation apparatus comprises: a wedge means for driving through the ground and for slidingly contacting and lifting the overburden substantially toward the surface of the ground; a driving attachment means attached to opposite sides of the wedge means and capable of extending generally upwardly through the surface of the ground for driving the wedge means below and substantially parallel to the surface of the ground; and lateral support means attached to opposite sides of the wedge means for guiding the overburden over the wedge means.

The driving attachment means may further comprise a depth adjustment means for selectively adjusting the depth of insertion of the wedge means below the surface of the ground.

The excavation apparatus may further comprise a loosening means attached to the driving attachment means for loosening the ground forward of the wedge means. The loosening means may include a plow means and/or a cutting chain means.

The excavation apparatus may also comprise a line attachment means attached to the wedge means for releasably attaching an installation utility line, whereby the excavation apparatus is capable of drawing the installation utility line therebehind.

The wedge means includes a leading edge, an inclined upper member extending rearwardly and upwardly from the leading edge, the inclined upper member having an upper surface, and a bottom member extending rearwardly from the leading edge and displaced from the inclined upper member.

The excavation apparatus may further comprise an incline adjustment means disposed between the inclined upper member and the bottom member for adjusting the displacement between the bottom member and the inclined upper member. The apparatus may also include a deflection means, attached to the wedge means and extending substantially vertically therefrom, for changing a direction of travel of the overburden which is displaced by the wedge means and which is slidingly transferred from the upper surface of the inclined upper member.

The incline adjustment means may be an actuator means disposed between the bottom member and the inclined upper member.

The excavation apparatus may further include a bedding application means, having a top portion and a bottom portion, for receiving a bedding material and applying the bedding material aft of the wedge means as the wedge means is driven through the ground. The top portion of the bedding application means may include a hopper means for receiving the bedding material, and the bottom portion of the bedding application means may include a spreading means for spreading the bedding material onto an installation location where a new utility line is to be installed. The bedding application means may further include an agitation means for facilitating transport of the bedding material through the bedding application means.

The overburden which is manipulated by the apparatus includes the ground and any pre-installed utility line.

The present invention also provides a method of manipulating one or more utility lines below the surface of the ground with an excavation apparatus, the excavation apparatus including a wedge member comprising a leading edge disposed at the forwardmost end of the wedge member, an inclined upper member extending rearwardly and upwardly from the leading edge, the inclined upper member having an upper surface capable of supporting a first utility line, and a bottom member extending rearwardly from the leading edge and displaced from the inclined upper member for contacting the ground beneath the first utility line, wherein the inclined upper member, the leading edge, and the bottom member define a wedge having opposite sides disposed at opposite ends of the leading edge, the method comprising the following steps: inserting the wedge member below the surface of the ground; positioning the leading edge of the wedge member beneath the first utility line; driving the wedge member substantially parallel to the surface of the ground; maintaining sliding contact between the fkst utility line and the upper surface of the inclined upper member as the wedge member is driven beneath the first utility line; and displacing the first utility line from a resting position toward the surface of the ground.

The method may further comprise the steps of removably attaching a second utility line to an aft portion of the excavation apparatus, and dragging the second utility line behind the excavation apparatus in a substantially fixed relation to the excavation apparatus. The method may also include having the second utility line dragged substantially into the resting position of the first utility line. The method may further include the step of guiding the overburden displaced by the wedge means over the upper surface of the inclined upper member.

BRIEF DESCRIPTION OF THE DRAWINGS

Understanding of the present invention and the various aspects thereof will be facilitated by reference to the accompanying drawings.

DETAILED DESCRIPTION OF THE PREFERRED EMBODIMENTS

Reference is now made to the drawings on which similar or identical elements are given consistent identifying numerals throughout the various figures thereof, in which parenthetical references to figure numbers direct the reader to the view(s) on which the element(s) being described is(are) best seen, although the element(s) may also be seen on other views.

Various embodiments of the present invention are presented in FIGS. 1–19.

Figure 1:
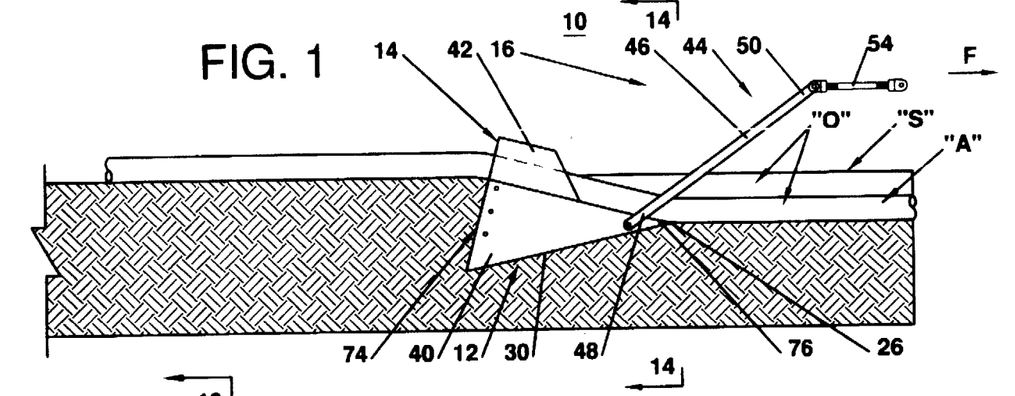
FIG. 1 is a side elevational view of a apparatus in accordance with the present invention, the apparatus as shown removing a previously installed pipeline or utility line.

A first embodiment of the excavation apparatus 10 of the invention is illustrated in FIG. 1. The apparatus 10 includes a wedge means 12, a lateral support means 14, and a driving attachment means 16. The driving attachment means 16 is attached to opposite sides of the wedge means 12 and preferably extends generally upwardly through the surface of the ground. The apparatus 10 can be inserted below an overburden "O" located beneath the surface "S" of the ground and can be driven through the ground from the surface. The overburden "O" may be any object or material located above the wedge means 12, e.g., the ground, a previously iratailed, or pre-existing, utility line "A" such as a pipeline, cable, wire, etc., and/or a surface topping, such as pavement, concrete, asphalt, etc., and/or any other miscellaneous buried objects in or on the ground. The overburden "O" may, of course, comprise a combination of such elements, such as a utility line covered by clay, soil, and surface pavement.

The wedge means or wedge member 12 includes a leading edge 26, an inclined upper member 28 extending rearwardly and upwardly from the leading edge 26, and a bottom member 30 extending rearwardly from the leading edge 26 and displaced from the inclined upper member 28, wherein the leading edge 26, ihclined upper member 28 and bottom member 30 define a forward-facing wedge. The inclined upper member 28 has an upper surface 32 which can support an overburden "O". The lateral support means 14 guides the overburden "O" over the upper surface 32 of the inclined member 38 of the wedge means 12 as the wedge means passes below the surface of the ground. The driving attachment means 16 is attached to the wedge means or wedge member 12 and is capable of driving the wedge means below the ground and substantially parallel to the surface of the ground. The driving attachment means 16 may further comprise a depth adjustment means 34 for selectively adjusting the depth of the insertion of the wedge means 12 below the surface of the ground.

As seen in the second embodiment of FIG. 2, the wedge means 12 may also includes a line attachment means 36 attached to the wedge means for releasably attaching a "new" utility line, or installation utility line, "B", which is to be installed below the surface "S" of the ground. Thus, the apparatus 10 would be capable of drawing the installation utility line "B" into position beneath the ground, and further could be adapted to draw the installation line substantially into the previous resting position of a removed pre-existing line "A".

The lateral support means 14, as shown, for example, in FIGS. 1, 2, 3, 15 and 16, preferably comprises a pair of side supports 40 disposed on the respective opposite sides of the wedge member 12, the pair of side supports 40 extending substantially vertically upward from the bottom member 30. At least a portion 42 of each of the pair of side supports extends above the inclined upper member 28, thereby providing guides to maintain the path of the displaced overburden to pass between the pair of side supports 40. A portion of each of the side supports 40 may further comprise a ground breaking leading edge, to facilitate passage through the ground.

Figure 14:
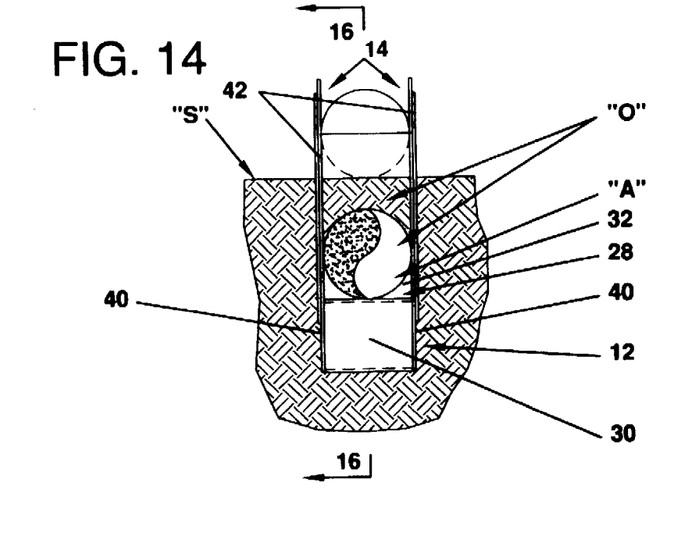
FIG. 14 is a view taken along line A—A of FIG. 1.
Figure 15:
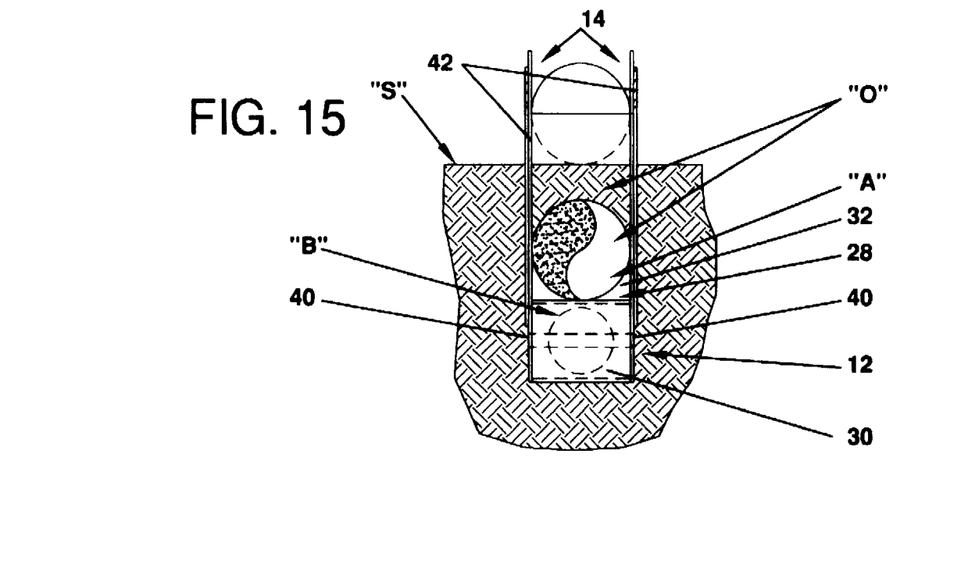
FIG. 15 is a view taken along line B—B of FIG. 2.

FIGS. 14 and 15 show the removed utility line "A" as passing adjacent, or nearly touching, the lateral support means 14, as this would tend to minimize the width of the path of the apparatus 10, thereby reducing the force F necessary to pass the wedge member 12 through the ground; however, the dimensions of the apparatus 10 and utility line "A" may be such that the spacing between the pair of side supports 40 is substantially greater than the diameter of the utility line "A" to be removed, especially when the available driving power supply is much greater than the driving power requirements for a given apparatus operating under various conditions.

Figure 3:
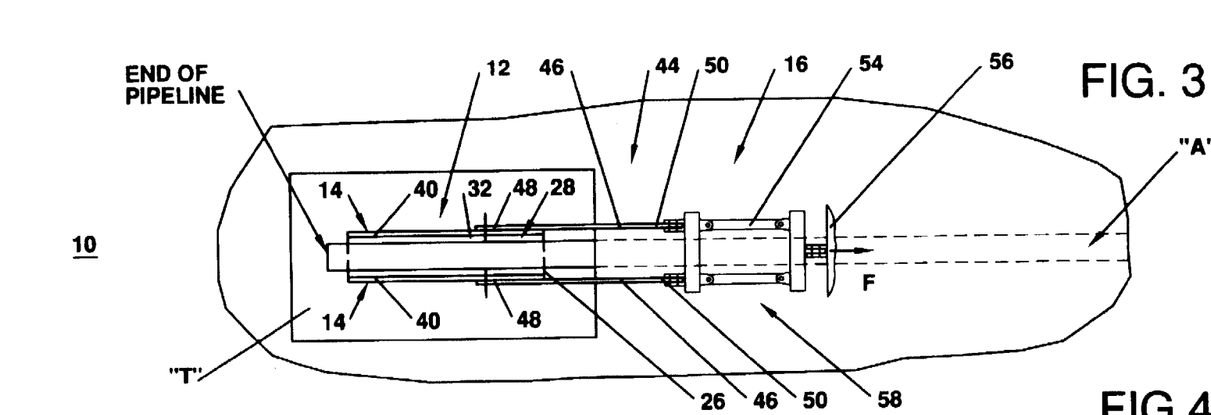
FIG. 3 is a top view of the apparatus of FIG. 1 shown removing a previously installed pipeline or utility line.
Figures 4, 17:
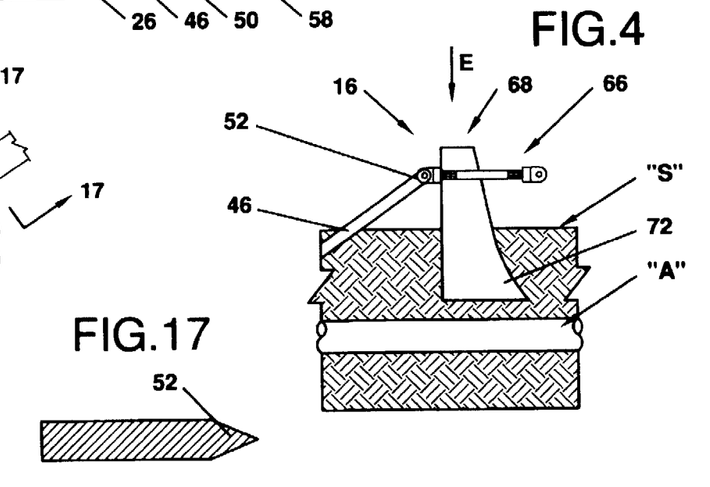
FIG. 4 is a side elevational view of a plow attachment connected to the apparatus of FIG. 1.
FIG. 17 is a view taken along line D—D of FIG. 16 showing a groundbreaking leading edge.

The driving attachment means 16 may comprise a depth adjustment means 44 for selectively adjusting the depth of insertion of the wedge means 12 below the surface of the ground. The depth adjustment means 44 may include a pair of arms 46 having proximal ends 48 disposed on the respective opposite sides of the wedge member 12 and having distal ends 50 capable of extending forwardly and generally upwardly from the wedge member 12, as best illustrated in FIG. 3. The proximal ends 48 of the pair of arms 46 are preferably pivotally mounted to the wedge member 12. Each arm 46 may include a groundbreaking leading edge, such as the substantially V-shaped leading edge 52 shown in FIG. 17.

The driving attachment means 16 may further comprise a stabilizer crosspiece member 54 connecting the distal ends 50 of the pair of arms 46, and wherein the pair of arms 46 are pivotally mounted to the stabilizer crosspiece member 54. As see in FIGS. 3 and 18, the stabilizer crosspiece member 54 includes a linkage member 56 adapted for releasable vehicle engagement so that the apparatus 10 may be releasably attached to a pulling or pushing vehicle such as a tractor, bulldozer, truck, or other vehicle capable of passing the apparatus 10 through the ground. The pair of arms 46, stabilizer crosspiece member 54, and linkage member 56 together may define a pulling assembly 58. In the third embodiment, illustrated in FIGS. 7–10 and the fourth embodiment illustrated in FIGS. 11–13, the depth adjustment means 44 comprises a linkage member 56, a first pair of arms 46, and a second pair of arms 60 disposed on respective opposite sides of the wedge member 12 aft of the first pair of arms 46, and having distal ends 62 capable of extending forwardly and generally horizontally from the wedge member 12. The proximal ends 64 of the second pair of arms 60 are preferably pivotally mounted to the wedge member 12, and the distal ends are preferably pivotally mounted to the linkage member 56, together defining another embodiment of a pulling assembly 58 absent a stabilizer crosspiece member.

As seen in FIGS. 4, 5, 6, 18 and 19, the apparatus may also include a loosening means 66 for loosening the ground forward of the wedge means 12. The loosening means 66 may comprise a plow means 68, shown in FIGS. 4 and 18, or a cutting chain means 70, shown in FIGS. 5, 6, and 19, or a combination of the plow means and cutting chain means. The plow means 68 comprises a plow member 72 disposed forward of the wedge member 12 and depending from the driving attachment means 16. The plow member 72, shown in FIGS. 4 and 18, depends downwardly from the crosspiece member 54 and is rigidly and removably attached thereto.

Figure 9:
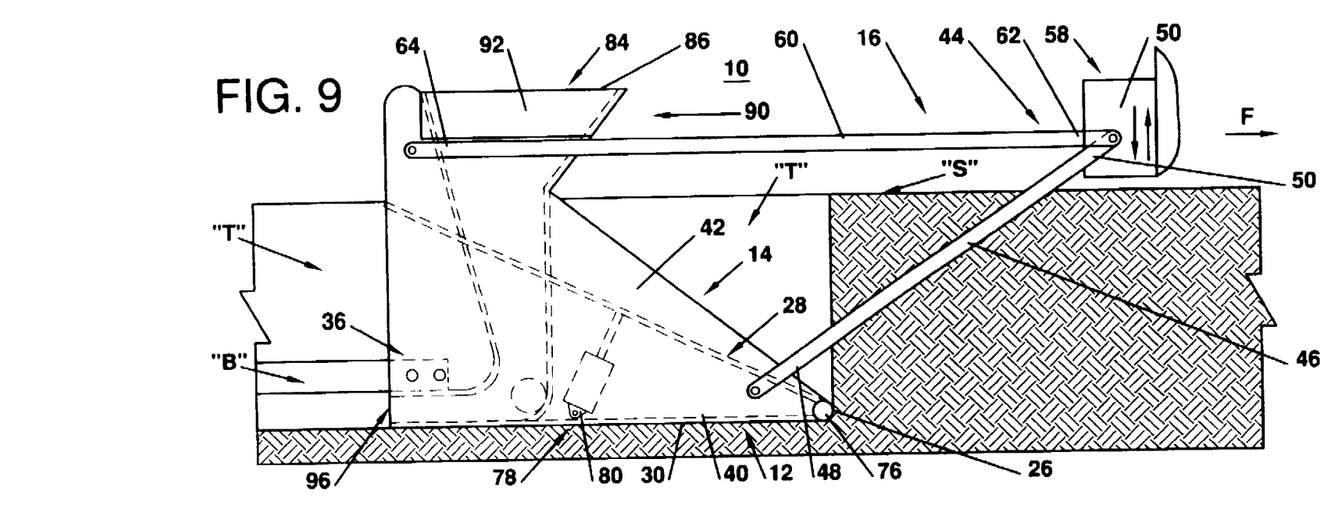
FIG. 9 is a side elevational view of the apparatus of FIG. 7, showing an incline adjustment means and an agitation means.

The apparatus 10 may further include an incline adjustment means 74 for adjusting the displacement between the bottom member 30 and the inclined upper member 28. The inclined upper member 28 is preferably pivotally or hingedly mounted to the bottom member 30. A hinge 76 may be disposed at, or aft of, the leading edge 26, connecting the inclined upper member 28 to the bottom member 30. The incline adjustment means 74 may comprise an actuator means 78 disposed between the bottom member 30 and the inclined upper member 28. The actuator means 78 may comprise a hydraulic piston assembly 80 as shown in FIG. 9 or a screw assembly (not illustrated).

Figures 5, 6, 18, 19:
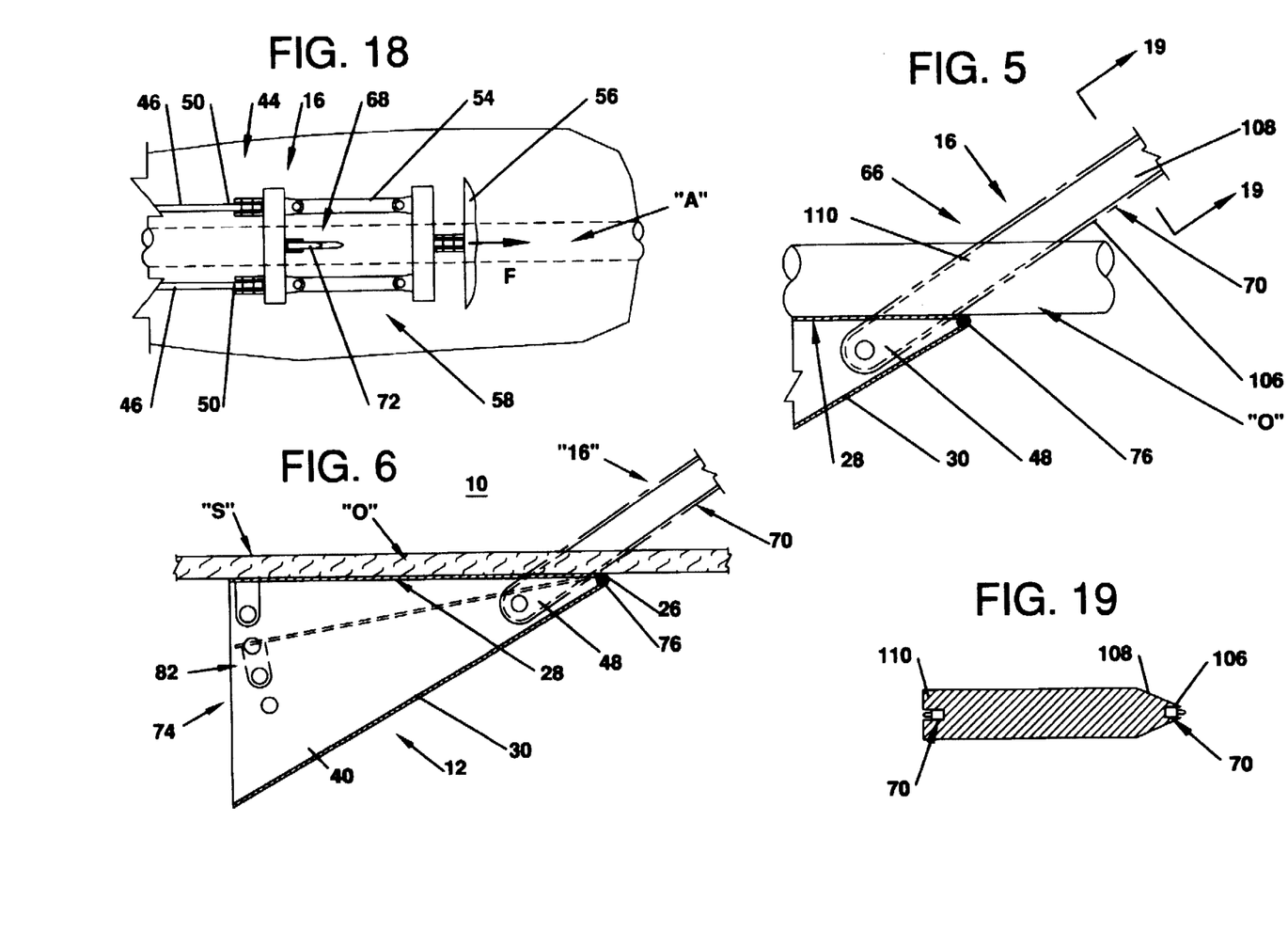
FIG. 5 is a partial side elevational view of a cutting chain means.
FIG. 6 is a side elevational view of the apparatus with the cutting chain means of FIG. 5 shown being driven through a pavement surface.
FIG. 18 is a top plan view of the plow member of FIG. 4.
FIG. 19 is a view taken along line F—F of FIG. 5 further showing the cutting chain means.
Figure 7:
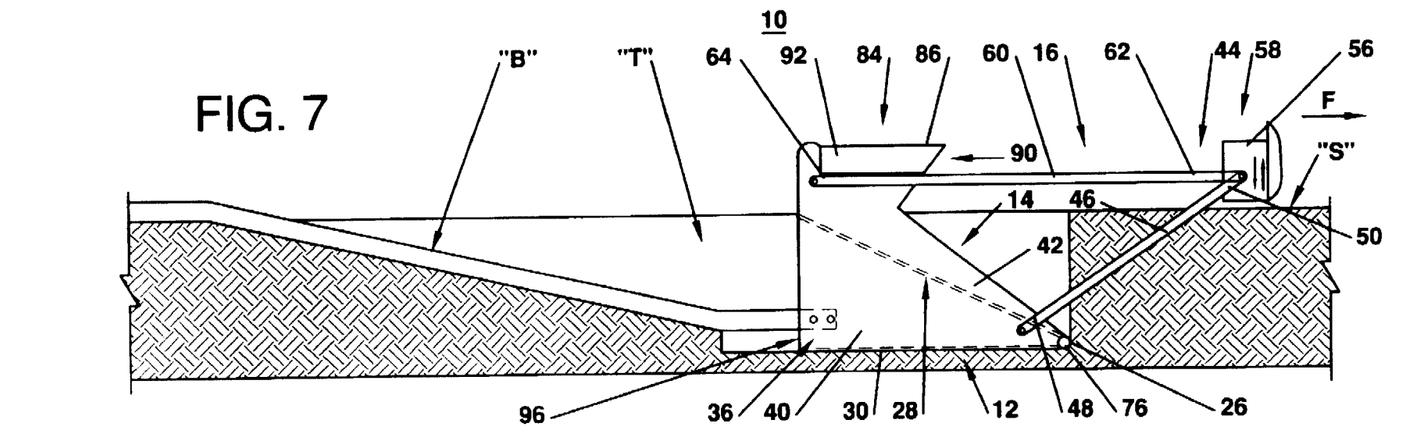
FIG. 7 is a side elevational view of the apparatus which includes a bedding application means, shown installing a new utility line.
Figure 8:
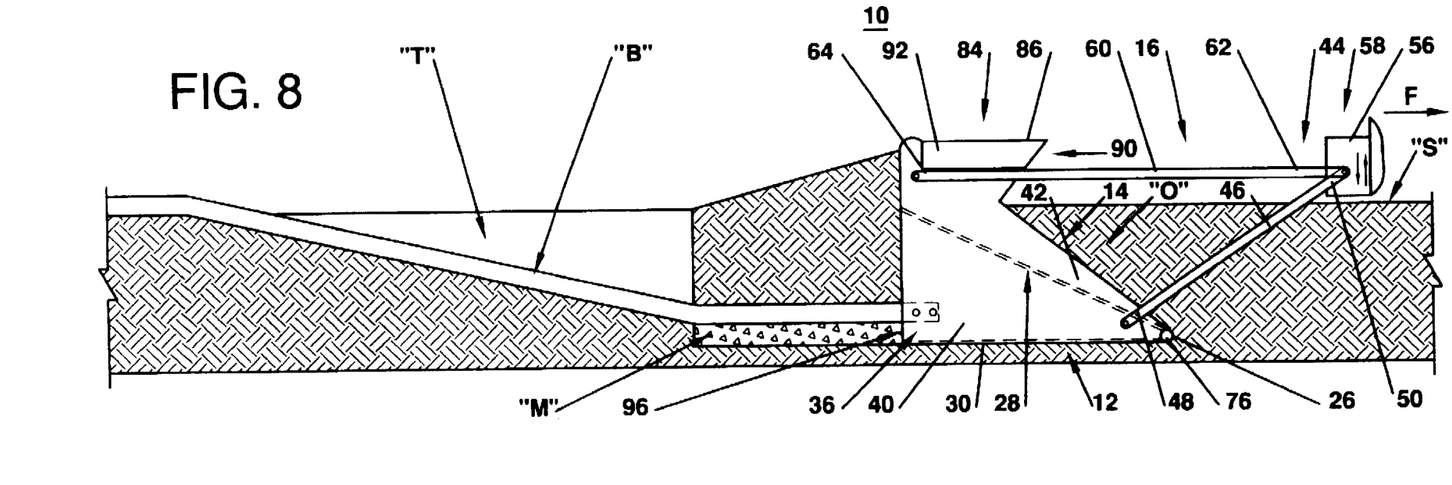
FIG. 8 is a side elevational view of the apparatus of FIG. 7, showing the application of bedding material and backfill.
Figure 16:
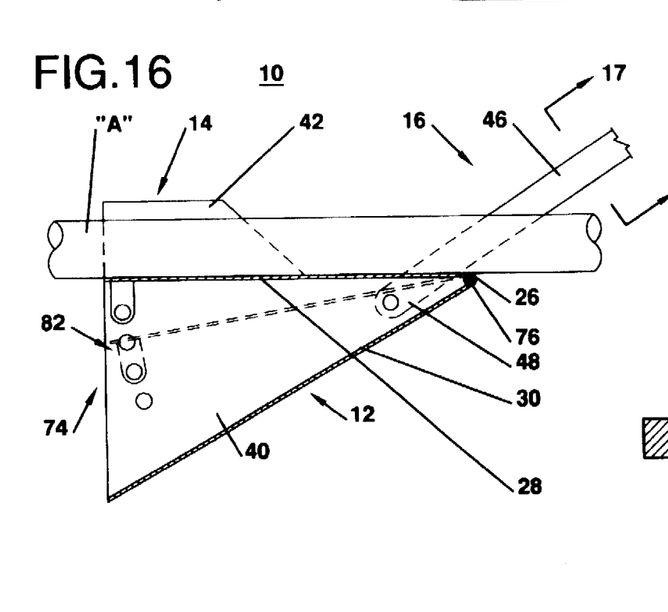
FIG. 16 is a view taken along line C—C of FIG. 14 illustrating one embodiment of an incline adjustment means.

As best seen in FIGS. 6 and 16, the incline adjustment means 74 may comprise a horizontal support means 82, such as pegs or bolts capable of being releasably attached to at least one of the pair of side supports 40 for supporting the inclined upper member 28 in a selected position. Thus, the apparatus 10 may include a horizontal support means 82 or an actuator means 78, a combination thereof, or some other incline adjustment mechanism.

The apparatus 10 shown in the third embodiment of FIGS. 7–10 includes a bedding application means 84 having a top portion 86 and a bottom portion 88, the bedding application means preferably being disposed on the wedge means 12 aft of the leading edge 26. The bedding application means 84 may receive a bedding material "M" such as sand, stone, crushed stone or the like, and apply the bedding material below the surface of the ground in an installation location where the installation utility line "B" is to be installed. The installation location may substantially occupy the location of a previously installed utility line "A" which has been removed.

The top portion 86 of the bedding application means 84 may further comprise a hopper means 90 for receiving the bedding material "M". The hopper means 90 includes an upwardly facing mouth 92 capable of receiving the bedding material therein. Bedding material "M" is placed into the hopper means 90 and is fed by gravity through the remainder of the bedding application means 84. The bottom portion 88 of the bedding application means 84 may further comprise a spreading means 94 for spreading the bedding material onto the installation location. The spreading means 94 preferably comprises a backwardly facing diffusing mouth 96 through which the bedding material is capable of exiting the hopper means 90.

The bedding application means 84 may further comprise an agitation means 98, as seen in FIG. 9, for facilitating transport of the bedding material "M" through the bedding application means.

Figure 11:
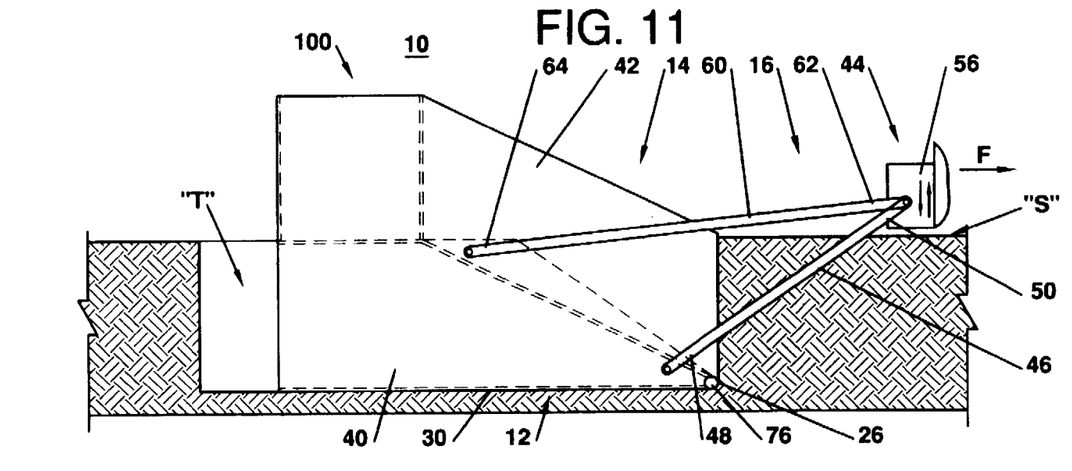
FIG. 11 is a side elevational view of a second embodiment of a apparatus according to the present invention, which includes a deflection means, shown forming a trench without the removal or installation of a utility line.
Figure 12:
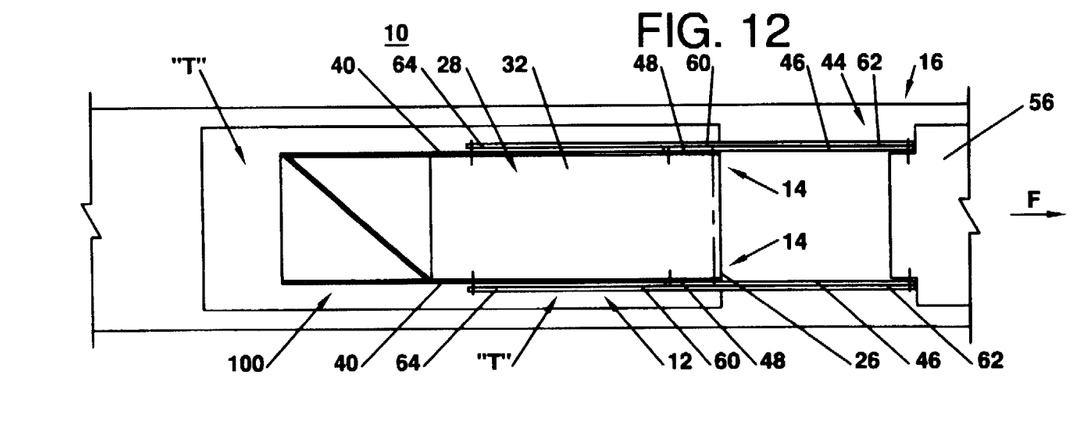
FIG. 12 is a top plan view of the apparatus of FIG. 11.
Figure 13:
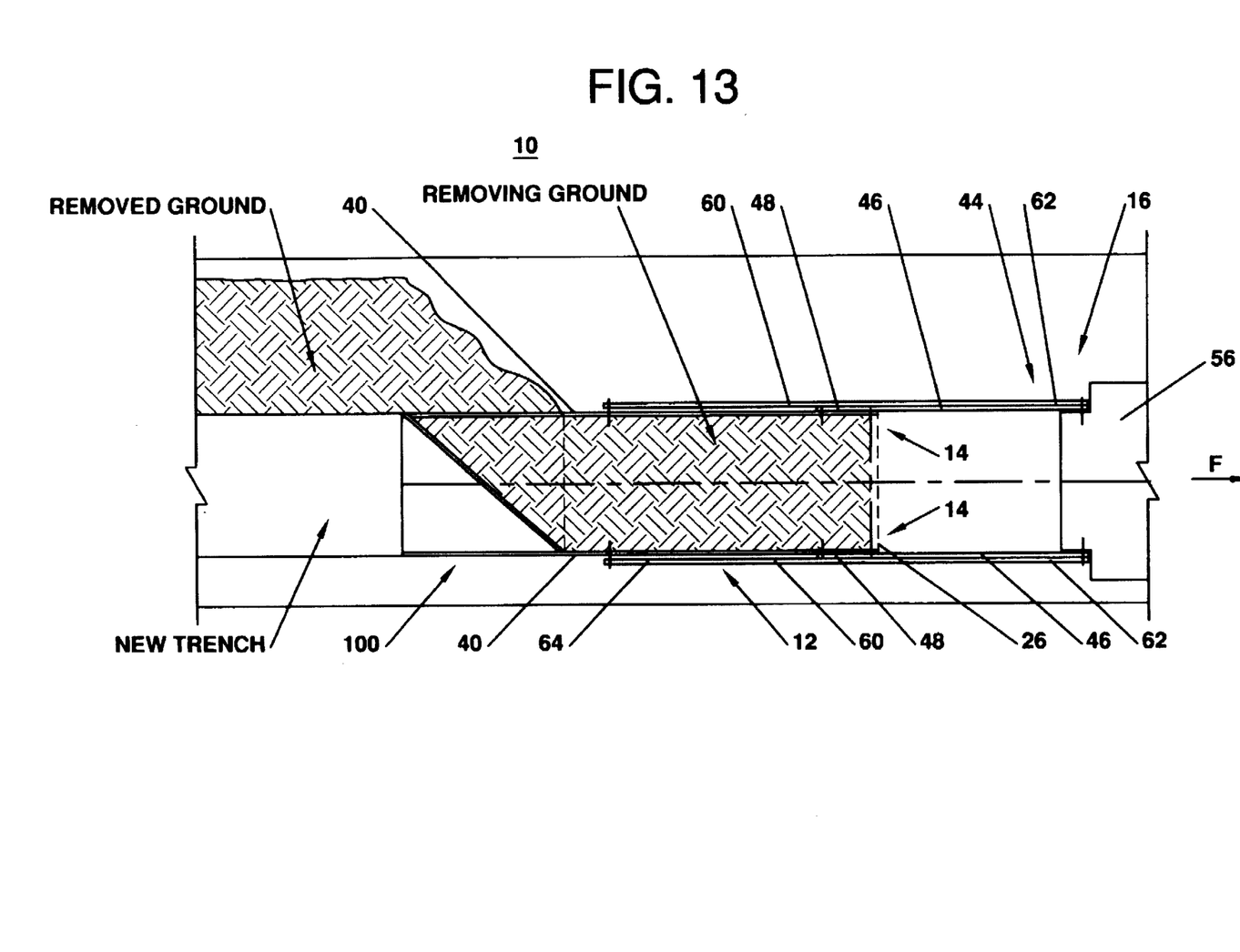
FIG. 13 is a top plan view of the apparatus of FIG. 11 showing the path of the ground removed during the formation of a trench.

The apparatus 10 may further comprise a deflection means 100, illustrated in the fourth embodiment of FIGS. 11–13 as being attached to the wedge means 12 and extending substantially vertically therefrom, for changing a direction of travel of the overburden "O" which is displaced by the wedge means 12 and which is slidingly transferred from the upper surface 32 of the inclined upper member 28. Thus, the overburden "O", such as the soil comprising the ground and/or a utility line, may be deflected at some angle after the apparatus 10 lifts the overburden 18 out of its resting position. The apparatus 10 thus configured serves to guide the removed overburden "O" and deflect or "plow" the overburden preferably to one side as illustrated in FIG. 13, thus establishing an open trench for further use, such as for installation of new utility line "B".

The deflection means 100 shown in the fourth embodiments of FIGS. 11–13 includes a diagonal member 102 extending substantially vertically upward from the upper surface 32 of the inclined upper member 28 and diagonally extending from one of the pair of side supports 40 to the other.

The deflection means 100 in the fourth embodiment shows one of the pair of side supports 40 as further including a supplemental side portion 104 upwardly extending higher than the portion 42 of the other one of the pair of side supports 40 for providing additional support and guidance of the overburden "O" as it is deflected to the other side. As best seen in FIGS. 12–13, the supplemental side portion 104 is disposed on the same side of the wedge member 12 as the forwardly disposed edge of the diagonal member 102.

The wedge means in FIGS. 11–13 further comprises an extended rear portion 106 having a substantially flat upper surface 108. The rear portion 106 may thus serve as a support for the diagonal member 102 and for any overburden "O" passing thereover.

Referring to the first embodiment in FIG. 1, one example of the use of the apparatus may be to lift an "old" or "pre-existing" or "previously installed" utility line "A" out of the ground. The angle of the wedge 30 may be adjusted by the incline adjustment means 74 prior to insertion beneath the ground. The apparatus 10 is preferably connected to a mobile piece of powered equipment, such as a tractor, by the driving attachment means 16. The wedge member 12 is placed beneath the surface of the ground and below the bottom of the utility line "A". The apparatus 10 is then pulled forward by the tractor with force F. The overburden "O", in this case the utility line "A" and the surrounding ground, are lifted up out of the ground. As the wedge member 12 is passed beneath successive portions of the buried utility line "A", the upper surface 32 of the inclined upper member 28 supports the utility line "A" from below, and the removed utility line "A" tends to remain near the surface of the ground while the remainder of the overburden "O", e.g., the soil in this case, tends to fall back into the "voided" or excavated area. Due to the continuous length of a section, or joined sections, of utility line "A", the initial portion of the utility line remains suspended by the wedge member 12 and the remainder of the buried section of utility line as the soil is driven off the wedge member 12 with the forward progress of the apparatus 10 and falls back downward. The top surface of the overburden or fallen soil can then support the removed utility line "A" before the next successive section of removed utility line is lowered. The lateral support means 14 guides the overburden "O", here, the utility line "A" and soil, over the wedge means 12.

Figure 2:
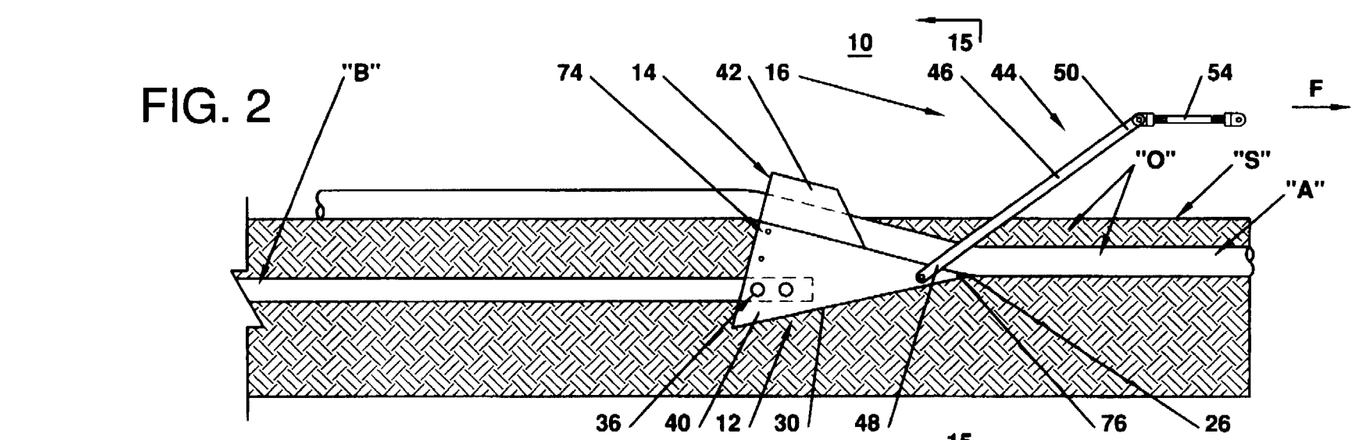
FIG. 2 is a side elevational view of the apparatus of FIG. 1 shown removing a previously installed pipeline or utility line and installing a new pipeline or utility line.

Referring to the second embodiment in FIG. 2, the apparatus 10 may also be used to install a new utility line or installation line "B". Sections of the line "B" may be joined and tested above the surface of the ground, then attached to the apparatus 10 by the line attachment means 36. As the wedge member 12 is propelled beneath the surface of the ground, the installation line "B" is dragged forward into the void space formed by the wedge member 12. It should be understood that an installation line "B" may be installed while simultaneously removing a pre-installed utility line "A", or, if no pre-existing line "A" is present, an installation line "B" may be installed into the void space formed in the ground by the wedge member 12. In either case, the overburden "O" minus any previously installed utility line "A" falls on top of the newly installed line "B" as a non-compacted fill. The installation line "B" is further dragged through the non-compacted fill until the entire length of installation line "B" is drawn into place. The fill may then be finally compacted on top of the installed line.

Figure 10:
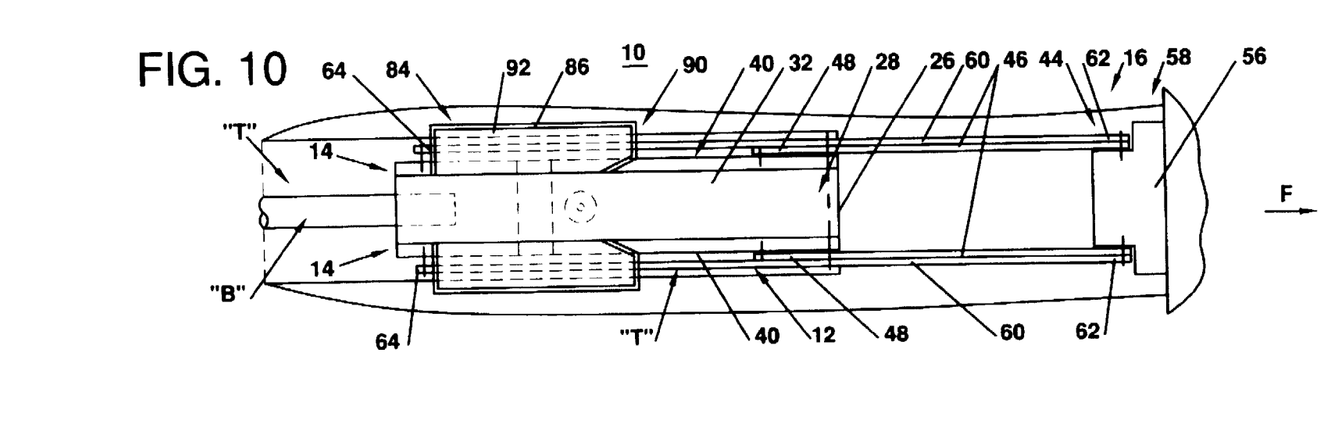
FIG. 10 is a top plan view of the apparatus of FIG. 7.

Referring to the third embodiment in FIGS. 7–10, the apparatus 10 may also be used to place bedding material "M" below the new installation pipe "B". As best seen in FIG. 9, the line attachment means 36 is attached to the wedge means 12 above the spreading means 94 of the bedding application means 84. The bedding material exits "M" the bedding application means 84 through the spreading means 94, which dispenses and spreads the bedding material onto the installation location and below the installation line "B" attached to the wedge member 12. Although not shown in FIGS. 7–10, the apparatus 10 may simultaneously remove a pre-installed utility line "A" while installing a new line "B". As best seen in FIG. 10, the overburden "O" is guided over the inclined upper member 28 by the lateral support means 14 as well as by the opposing side walls 102 of the hopper means 90. Bedding material "M" may be fed into the hopper means 90 on either side or on both sides of the inclined upper member 28.

The apparatus 10 may also be used to excavate an open trench according to the fourth embodiment of FIGS. 11–13. The overburden "O" is plowed to one side by the deflection means 100.

As illustrated in FIGS. 7–13, an initial trench or first trench "T" is preferably excavated prior to insertion of the apparatus below the ground to properly locate the wedge means 12 below the surface of the ground, and in particular, in relation to the bottom of any pre-installed utility line "A".

Referring to FIGS. 5 and 19, each arm 46 of the depth adjustment means 44 may be provided with a cutting chain means 70 for loosening the overburden "O" with a sawing, ripping or tearing action. At least a portion 106 of the cutting chain means 70 is disposed in a forward or leading edge 108 of one, or preferably both, of the pair of arms 46. A continuous loop cutting chain may pass around the proximal and distal ends of each arm, passing along the leading edge 108, looping around an end, and passing along the back face 110 of the arms 46, as illustrated in FIGS. 5 and 19. The cutting chain means 70 may be powered by a separate motor assembly known in the art. The cutting chain means 70 may thus be activated while the apparatus 10 is propelled through the ground. The cutting chain means 70 would be particularly suitable for sawcutting any pavement disposed at the surface of the ground.

Thus, the present invention also provides a method of manipulating one or more utility lines "A" below the surface of the ground with a apparatus 10, the apparatus including a wedge member 12 comprising a leading edge 26 disposed at the forwardmost end of the wedge member 12, an inclined upper member 28 extending rearwardly and upwardly from the leading edge 26, the inclined upper member 28 having an upper surface 32 capable of supporting a first utility line "A", and a bottom member 30 extending rearwardly from the leading edge 26 and displaced from the inclined upper member 28 for contacting the ground beneath the first utility line "A", wherein the inclined upper member 28, the leading edge 26, and the bottom member 30 define a wedge having opposite sides disposed at opposite ends of the leading edge 26.

The method comprises the following steps: (a) inserting the wedge member 12 below the surface of the ground; (b) positioning the leading edge 26 of the wedge 12 member beneath the first utility line "A"; (c) driving the wedge member 12 substantially parallel to the surface of the ground; (d) maintaining sliding contact between the first utility line "A" and the upper surface 32 of the inclined upper member 28 as the wedge member 12 is driven beneath the first utility line; and (e) displacing the first utility line "A" from a resting position toward the surface of the ground. The method may further comprise the steps of removably attaching a second utility line "B" to an aft portion of the apparatus 10, and dragging the second utility line "B" behind the apparatus 10 in a substantially fixed relation to the apparatus. The method may also provide that the second utility line "B" is dragged substantially into the resting position of the first utility line "A".

What is claimed is:

1. An excavation apparatus for insertion below an overburden located beneath the surface of the ground and capable of being driven through the ground from the surface, said apparatus comprising:
   a. wedge means for driving through the ground and for slidingly contacting and lifting the overburden substantially toward the surface of the ground, said wedge means comprising a leading edge disposed at the forwardmost end of said wedge means and further comprising opposite sides disposed at opposite ends of said leading edge;
   b. driving attachment means attached to said opposite sides of said wedge means and capable of extending generally upwardly through the surface of the ground, for driving said wedge means below and substantially parallel to the surface of the ground; and
   c. lateral support means attached to said opposite sides of said wedge means for guiding the overburden over said wedge means.

2. An excavation apparatus according to claim 1 wherein said driving attachment means further comprises a depth adjustment means for selectively adjusting the depth of insertion of the wedge means below the surface of the ground.

3. An excavation apparatus according to claim 1 further comprising a loosening means attached to said driving attachment means for loosening the ground forward of said wedge means.

4. An excavation apparatus according to claim 1 further comprising a line attachment means attached to said wedge means for releasably attaching an installation utility line, whereby said excavation apparatus is capable of drawing the installation utility line therebehind.

5. An excavation apparatus according to claim 1 wherein said wedge means further comprises:
   a leading edge;
   an inclined upper member extending rearwardly and upwardly from said leading edge, said inclined upper member having an upper surface; and
   a bottom member extending rearwardly from said leading edge and displaced from said inclined upper member.

6. An excavation apparatus according to claim 5 further comprising an incline adjustment means disposed between said inclined upper member and said bottom member for adjusting the displacement between the bottom member and the inclined upper member.

7. An excavation apparatus according to claim 1 further comprising a deflection means, attached to said wedge means and extending substantially vertically therefrom, for changing a direction of travel of the overburden which is displaced by said wedge means and which is slidingly transferred from the upper surface of the inclined upper member.

8. An excavation apparatus according to claim 6 wherein said incline adjustment means further comprises an actuator means disposed between said bottom member and said inclined upper member.

9. An excavation apparatus according to claim 1 further comprising a bedding application means, having a top portion and a bottom portion, for receiving a bedding material and applying said bedding material aft of said wedge means as said wedge means is driven through the ground.

10. An excavation apparatus according to claim 9 wherein the top portion of said bedding application means further comprises a hopper means for receiving the bedding material.

11. An excavation apparatus according to claim 10 wherein the bottom portion of said bedding application means further comprises a spreading means for spreading the bedding material.

12. An excavation apparatus according to claim 9 wherein said bedding application means further comprises an agitation means for facilitating transport of the bedding material through said bedding application means.

13. An excavation apparatus according to claim 3 wherein said loosening means further comprises a plow means.

14. An excavation apparatus according to claim 3 wherein said loosening means further comprises a cutting chain means.

15. A method of manipulating one or more utility lines below the surface of the ground with an excavation apparatus, the excavation apparatus including a wedge member comprising a leading edge disposed at the forwardmost end of the wedge member, an inclined upper member extending rearwardly and upwardly from the leading edge, the inclined upper member having an upper surface capable of supporting a first utility line, and a bottom member extending rearwardly from the leading edge and displaced from the inclined upper member for contacting the ground beneath the first utility line, wherein the inclined upper member, the leading edge, and the bottom member define a wedge having opposite sides disposed at opposite ends of the leading edge, the method comprising the following steps:
   a. inserting the wedge member below the surface of the ground;
   b. positioning the leading edge of the wedge member beneath the first utility line;
   c. driving the wedge member substantially parallel to the surface of the ground;
   d. maintaining sliding contact between the first utility line and the upper surface of the inclined upper member as said wedge member is driven beneath the first utility line; and
   e. displacing the first utility line from a resting position toward the surface of the ground.

16. The method according to claim 15 further comprising the following steps:
   a. removably attaching a second utility line to an aft portion of the excavation apparatus; and
   b. dragging the second utility line behind the excavation apparatus in a substantially fixed relation to the excavation apparatus.

17. The method according to claim 16 wherein the second utility line is dragged substantially into the resting position of the first utility line.

18. The method according to claim 15 further comprising the step of guiding the ground and first utility line displaced by the wedge means over the upper surface of the inclined upper member.

19. An excavation apparatus for insertion below the surface of the ground, and capable of removing a first utility line and/or laying a second utility line, said excavation apparatus comprising:
   a. a wedge member including:
      a leading edge disposed at the forwardmost end of said wedge member;
      an inclined upper member extending rearwardly and upwardly from said leading edge, said inclined upper member having an upper surface capable of supporting the first utility line;

a bottom member extending rearwardly from said leading edge having a portion angularly displaced from said inclined upper member;

wherein said inclined upper member, said leading edge, and said bottom member define a wedge having opposite sides disposed at opposite ends of said leading edge, said wedge capable of being driven beneath the first utility line whereby said inclined upper member is capable of slidingly contacting and lifting the first utility line in a substantially vertical direction; and b. a driving attachment means attached to said opposite sides of said wedge member and capable of extending generally upwardly through the surface of the ground for driving said wedge member below and substantially parallel to the surface of the ground; and c. a utility line attachment means disposed on said wedge member aft of said leading edge, said utility line attachment means being adapted for releasably attaching the second utility line;

d. a pair of side supports disposed on the respective opposite sides of said wedge and extending substantially vertically upward from said bottom member, wherein at least a portion of each of said pair of side supports extends above said inclined upper member, said pair of side supports being capable of guiding the first utility line over the inclined upper member;

whereby said excavation apparatus is capable of being driven under the first utility line, thereby raising said utility line substantially toward the surface of the ground; and whereby said excavation apparatus is capable of drawing the second utility line therebehind.

20. An excavation apparatus according to claim 19 further comprising an incline adjustment means disposed between said inclined upper member and said bottom member for adjusting a displacement therebetween.

21. An excavation apparatus according to claim 20 wherein said inclined upper member is pivotally mounted to said bottom member.

22. An excavation apparatus according to claim 21 wherein said leading edge further comprises a hinge connecting said inclined upper member to said bottom member.

23. An excavation apparatus according to claim 20 wherein said incline adjustment means further comprises an actuator means disposed between said bottom member and said inclined upper member.

24. An excavation apparatus according to claim 23 wherein said actuator means further comprises a hydraulic piston assembly.

25. An excavation apparatus according to claim 23 wherein said actuator means funher comprises a screw assembly.

26. An excavation apparatus according to claim 20 wherein said incline adjustment means further comprises a horizontal support means disposed on at least one of said pair of side supports for supporting said upper incline member in a selected position.

27. An excavation apparatus according to claim 19 wherein said driving attachment means further comprises a pulling assembly extending forwardly and generally upwardly from said wedge member.

28. An excavation apparatus according to claim 27 wherein said pulling assembly funher comprises a pair of arms having proximal ends disposed on the respective opposite sides of said wedge member and distal ends capable of extending forwardly and generally upwardly from said wedge member.

29. An excavation apparatus according to claim 28 wherein the proximal ends of said pair of arms are pivotally mounted to said wedge member.

30. An excavation apparatus according to claim 29 wherein each of said pair of arms further comprises a ground breaking leading edge.

31. An excavation apparatus according to claim 29 wherein each of said pair of arms further comprises a substantially V-shaped leading edge.

32. An excavation apparatus according to claim 29 wherein said pulling assembly further comprises a stabilizer crosspiece member connecting the proximal ends of said pair of arms.

33. An excavation apparatus according to claim 19 further comprising a plow member disposed forward of said wedge member and depending from said driving attachment means.

34. An excavation apparatus according to claim 32 further comprising a plow member depending downwardly from said crosspiece member and being rigidly attached thereto.

35. An excavation apparatus according to claim 19 further comprising a bedding application means attached to said wedge member, having a top portion and a bottom portion, for receiving a bedding material and applying said bedding material below the surface of the ground in a location where the second utility line is to be installed, said bedding application means being disposed on said wedge thembet aft of said leading edge.

36. An excavation apparatus according to claim 35 wherein the top portion of said bedding application means further comprises a hopper means for receiving the bedding material.

37. An excavation apparatus according to claim 36 wherein said hopper means includes an upwardly facing mouth capable of receiving the bedding material therein.

38. An excavation apparatus according to claim 37 wherein the bottom portion of said bedding application means further comprises a spreading means for spreading the bedding material onto said location.

39. An excavation apparatus according to claim 38 wherein said spreading means further comprises a backwardly facing diffusing mouth through which the bedding material is capable of exiting said hopper means.

40. An excavation apparatus according to claim 35 wherein said bedding application means further comprises an agitation means for facilitating transport of the bedding material through said bedding application means.

41. An excavation apparatus according to claim 19 further comprising a deflection means, attached to said wedge member and extending substantially vertically therefrom, for changing a direction of travel of the ground and/or first utility line which is displaced by said wedge member and which is slidingly transferred over the upper surface of the inclined upper member.

42. An excavation apparatus according to claim 28 further comprising a cutting chain means disposed on at least one of said pair of arms for loosening the ground forward of said wedge member.

* * * * *